(12) United States Patent
Zhou

(10) Patent No.: US 8,842,428 B2
(45) Date of Patent: Sep. 23, 2014

(54) DOCKING STATION

(75) Inventor: Cong-Bing Zhou, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 334 days.

(21) Appl. No.: 13/287,282

(22) Filed: Nov. 2, 2011

(65) Prior Publication Data
US 2013/0050934 A1 Feb. 28, 2013

(30) Foreign Application Priority Data

Aug. 24, 2011 (CN) .......................... 2011 1 0247266

(51) Int. Cl.
 *G06F 1/16* (2006.01)
(52) U.S. Cl.
 CPC .................................. *G06F 1/1632* (2013.01)
 USPC ..................................... 361/679.41; 439/374
(58) Field of Classification Search
 CPC ................................................... G06F 1/1632
 USPC .......................... 361/679.33–679.45; 439/374
 See application file for complete search history.

(56) References Cited

U.S. PATENT DOCUMENTS

| | | | |
|---|---|---|---|
| 7,511,954 B2 * | 3/2009 | Tsai et al. ................ | 361/679.41 |
| 7,633,750 B2 * | 12/2009 | Fan et al. ................. | 361/679.43 |
| 7,978,466 B2 * | 7/2011 | Lewandowski et al. . | 361/679.41 |
| 8,098,488 B2 * | 1/2012 | Lewandowski et al. . | 361/679.41 |
| 8,323,040 B2 * | 12/2012 | Prest ............................. | 439/131 |
| 2006/0181840 A1 * | 8/2006 | Cvetko ......................... | 361/679 |
| 2007/0174645 A1 * | 7/2007 | Lin .............................. | 713/322 |
| 2008/0003860 A1 * | 1/2008 | Carnevali ..................... | 439/296 |
| 2008/0239658 A1 * | 10/2008 | Chou et al. ................... | 361/686 |
| 2009/0292851 A1 * | 11/2009 | Mead et al. ................... | 710/303 |
| 2010/0188808 A1 * | 7/2010 | Howarth et al. ......... | 361/679.41 |
| 2010/0265652 A1 * | 10/2010 | Agata et al. ............. | 361/679.41 |
| 2012/0162902 A1 * | 6/2012 | Zhou et al. .............. | 361/679.41 |

* cited by examiner

*Primary Examiner* — Adrian S Wilson
(74) *Attorney, Agent, or Firm* — Novak Druce Connolly Bove + Quigg LLP

(57) ABSTRACT

A docking station includes a housing, and an extending mechanism slidably received in the housing. The extending mechanism includes a connecting part. The extending mechanism moves from a first position exposed out of the housing to a second position received in the housing. When the extending mechanism moves to the first position, the connecting part is exposed out of the housing. When the extending mechanism moves to the second position, the connecting part is received in the housing.

18 Claims, 8 Drawing Sheets

DOCKING STATION

BACKGROUND

1. Technical Field

The present disclosure relates to a docking station, and particularly relating to a docking station allowing an electronic device to be inserted into and eject from it.

2. Description of Related Art

Docking stations are importation accessories for portable electronic devices, such as mobile phones. A docking station maybe used for supporting an electronic device on a surface and electrically connecting the electronic device with an exterior electrical apparatus. The docking station usually includes a housing and an interface projecting out of the housing. The interface can be inserted into the electronic device, whereby the electronic device is electrically connected to the docking station. However, when docking station is not being used, the interface is exposed from the docking station and can be easily contaminated, thereby damaging the docking station, furthermore, the appearance of the docking station may be influenced.

Therefore, a new docking station is desired to overcome the above-described shortcomings.

BRIEF DESCRIPTION OF THE DRAWINGS

The components in the drawings are not necessarily drawn to scale, the emphasis instead being placed upon clearly illustrating the principles of the docking station. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
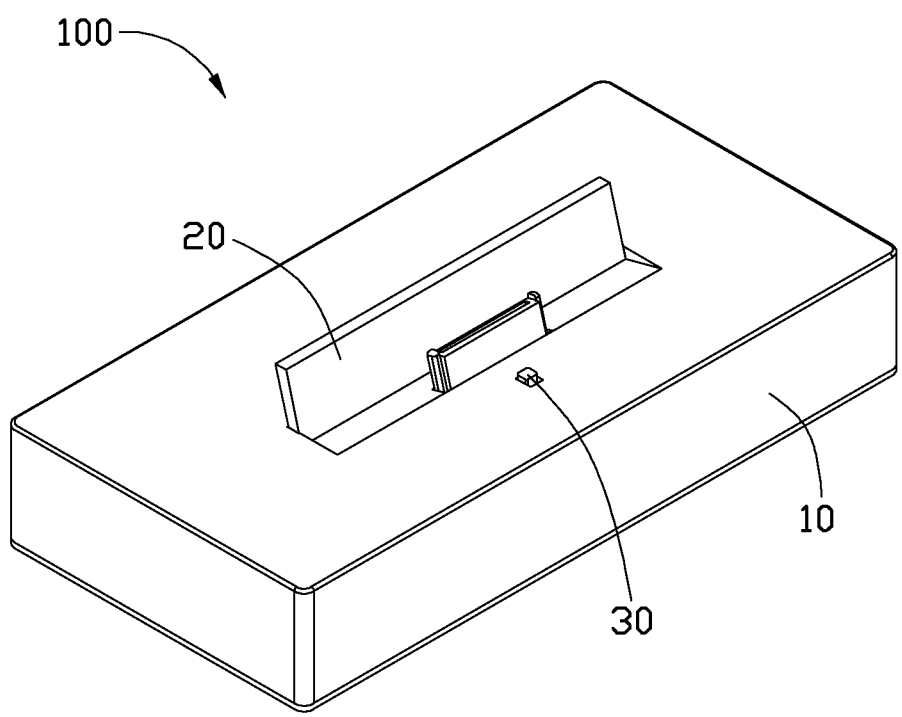
FIG. 1 is an isometric view of a docking station in accordance with an embodiment; the docking station includes a housing and is in a first state.
Figure 8:
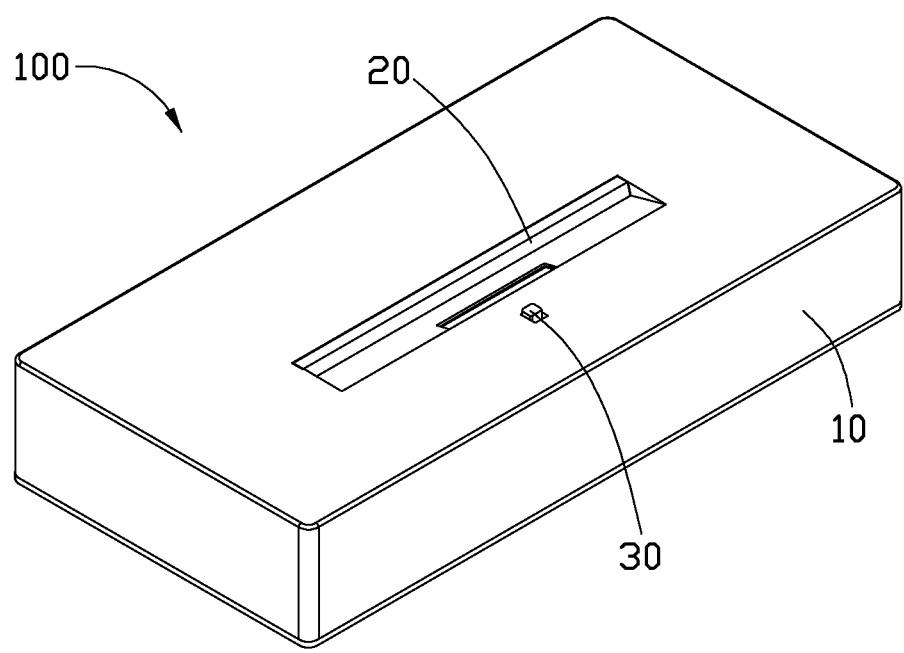
FIG. 8 is an isometric view of the docking station of FIG. 7 being in the second state.

Referring to FIG. 1, an isometric view of a docking station in accordance with an embodiment is shown. The docking station is in a first state. A docking station 100 is configured for supporting and electrically connecting an electronic device 200 (see FIG. 6). The docking station 100 includes a housing 10, an extending mechanism 20 slidably accommodated in the housing 10, and a locking mechanism 30 arranged in the housing 10. The housing 10 is a substantially hollow rectangular parallelepiped. The extending mechanism 20 supports and electrically connects to the electronic device 200. The extending mechanism 20 is capable of sliding from a first position as shown in FIG. 1 to a second position as shown in FIG. 8. In the embodiment, when the extending mechanism 20 is in the first position, part of the extending mechanism 20 is exposed out of the housing 10 to support and electrically connect to the electronic device 200; when the extending mechanism 20 is in the second position, the extending mechanism 20 is completely received in the housing 10. The locking mechanism 30 latches the extending mechanism 20 to the housing 10 when the extending mechanism 20 is in the first position or in the second position. The electronic device 200 may be a mobile phone, a personal digital assistant (PDA), or a media player.

Figure 2:
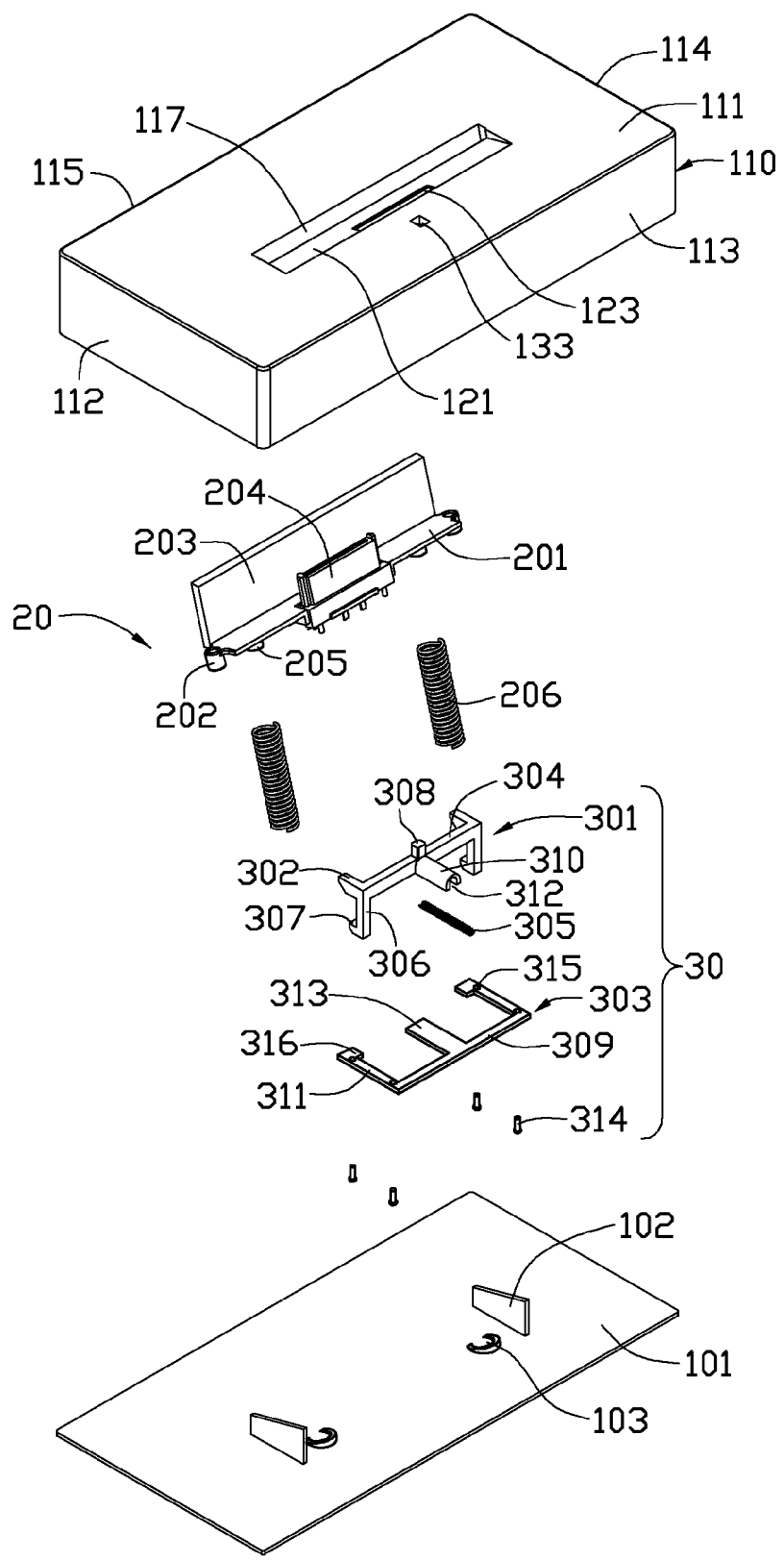
FIG. 2 is an exploded view of the docking station of FIG. 1, the housing includes a body and a bottom plate.
Figure 3:
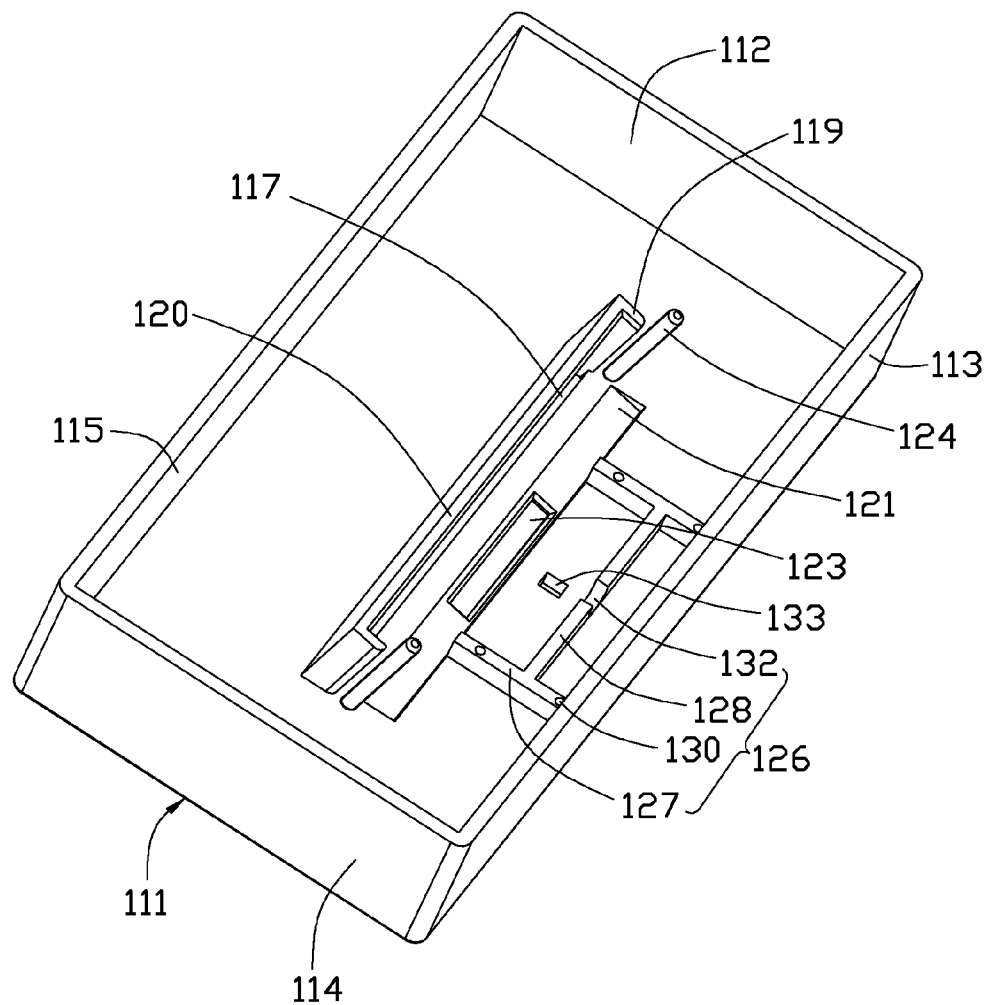
FIG. 3 is an isometric view of the body of FIG. 2. in a view angle different from FIG. 2.
Figure 4:
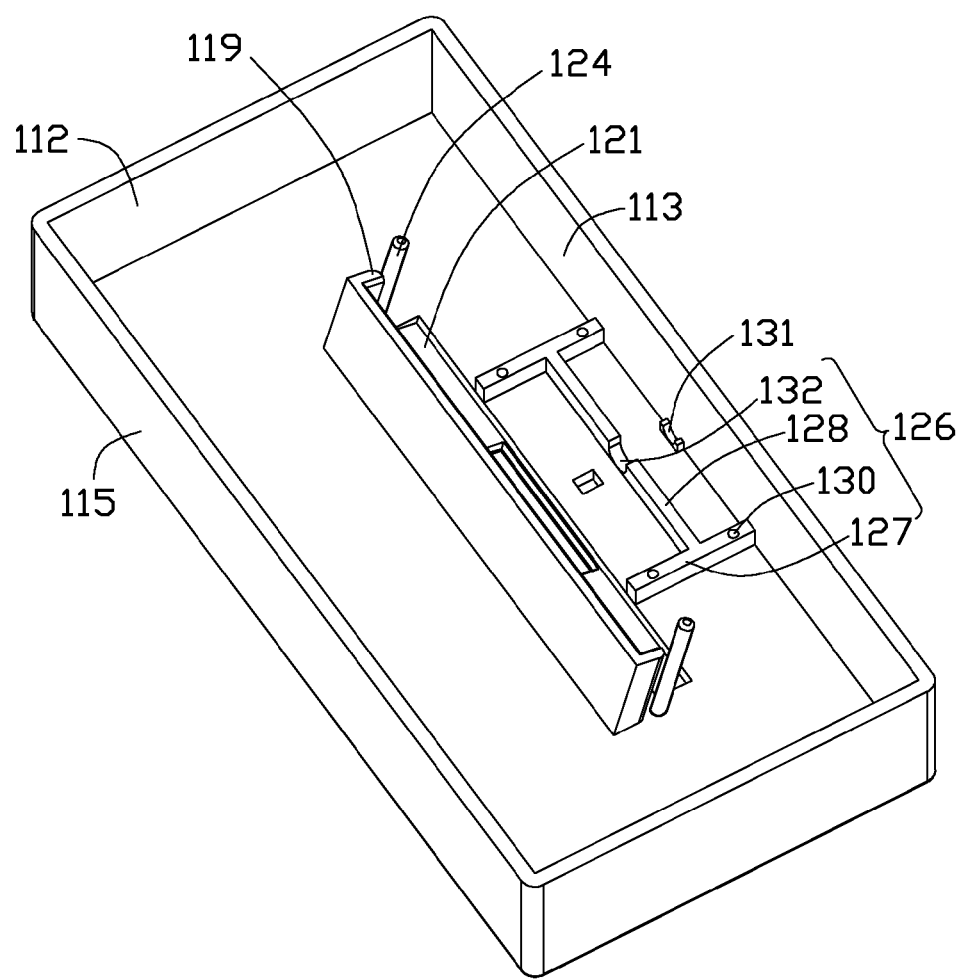
FIG. 4 is an isometric view of the body of FIG. 2. in a view angle different from FIG. 3.

Referring to FIGS. 2-4, the housing 10 includes a bottom plate 101 and a body 110. The bottom plate 101 is detachable from the body 110. The body 110 includes a top plate 111 and four sidewalls projecting from rims of the top plate 111. The four sidewalls include two opposite first and second sidewalls 112, 114 and two opposite third and fourth sidewalls 113, 115. The top plate 111 is opposite to the bottom plate 101. The four sidewalls 112, 113, 114, 115 are successively connected. A mounting surface of the bottom plate 101 facing the top plate 111 defines two opposite baffles 102 and two restricting members 103. In this embodiment, the baffles 102 are substantially wedge-shaped. The two baffles 102 maintain a distance therebetween. The two restricting members 103 are defined between the two baffles 102. Each restricting member 103 is adjacent to a corresponding one of the two baffles 102. The restricting members 103 can be shaped as a protruding structure, for example, circle, circular arc, partial circular arc and so on.

Figure 6:
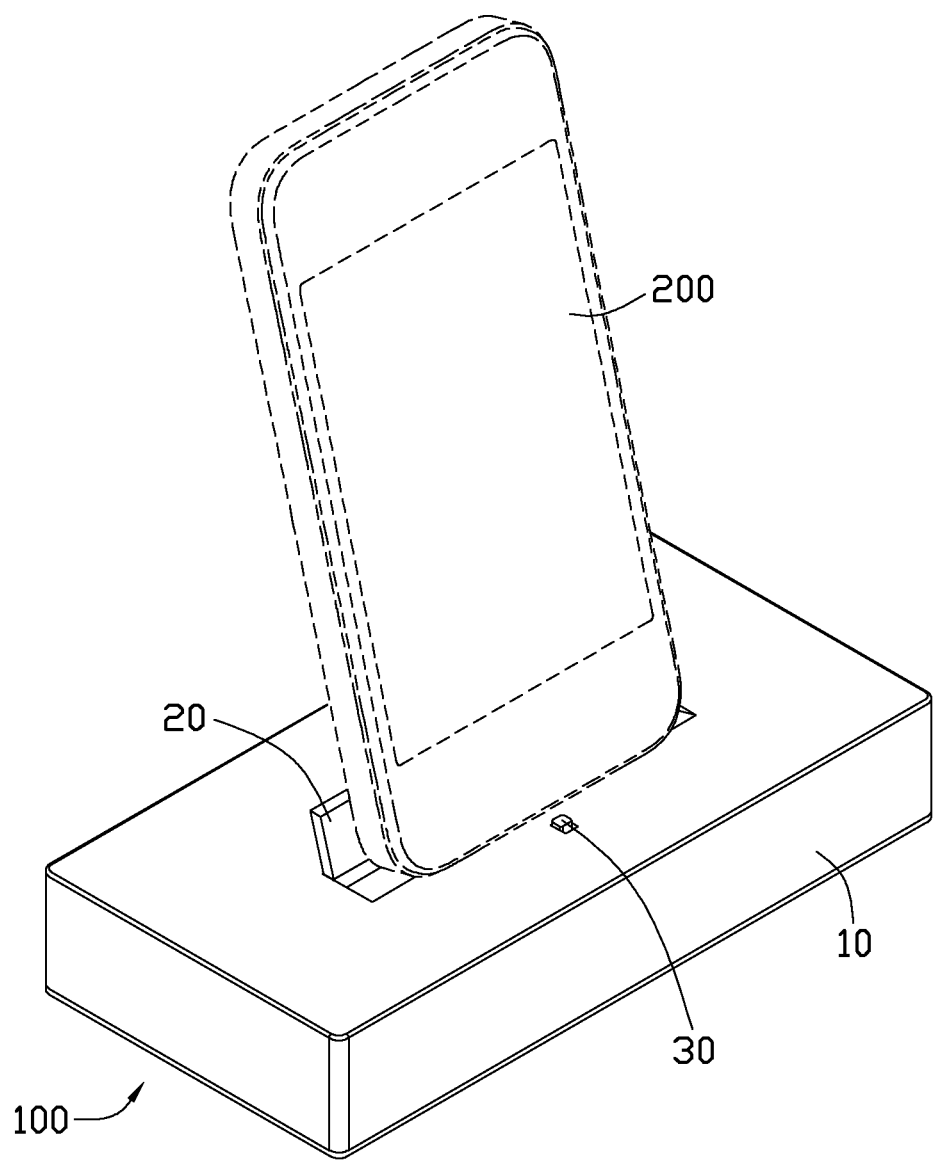
FIG. 6 is an isometric view showing the docking station of FIG. 5 supporting an electronic device.

A first through hole 117 is defined in the top plate 111. The top plate 111 forms two opposite fifth sidewalls 119, and a sixth sidewall 120 connected with the two fifth sidewalls 119 (see FIG. 3) at an inner surface thereof. The fifth sidewalls 119 and the sixth sidewall 120 are located near the rim of the first through hole 117 and cooperatively surround a portion of the first through hole 117. A supporting member 121 is defined in the top plate 111. The supporting member 121 is located between the third sidewall 113 and the first through hole 117 and is adjacent to a side of the first through hole 117. A supporting surface of the supporting member 121 is lower than the external surface of the top plate 111. The supporting surface of the supporting member 121 is configured to support the electronic device 200 as shown in FIG. 6. A second through hole 123 is defined in the supporting member 121. Two columnar guiding poles 124 are defined in the inner surface of the top plate 111. Each of the guiding poles 124 is adjacent to one of the fifth sidewalls 119 and a corresponding end of the supporting member 121. The guiding poles 124 are inclined to an extending direction of the fifth sidewalls 119.

The inner surface of the top plate 111 further defines a fixing bracket 126 which is positioned between the third sidewall 113 and the supporting member 121. The fixing bracket 126 includes two opposite fixing members 127 and a first connecting member 128 defined between the two fixing members 127. The two fixing members 127 are parallel to each other and two ends of each fixing member 127 are resisted against the third sidewall 113 and the supporting member 121, respectively. The first connecting member 128 is perpendicular to the two fixing members 127. Each fixing member 127 defines two fixing holes 130 at two opposite ends. The centre of the first connecting member 128 defines a U-shaped guiding groove 132. A U-shaped position member 131 corresponding to the guiding groove 132 protrudes from the inner surface of the top plate 111 and is adjacent to the third sidewall 113 (see FIG. 4). The top plate 111 further defines a locking hole 133 between the supporting member 121 and the first connecting member 128 adjacent to the U-shaped guiding groove 132.

The extending mechanism 20 includes a main plate 201, a supporting plate 203 perpendicularly connected to the main plate 201, a connecting part 204 fixed to the main plate 201, and two first elastic members 206. The main plate 201 is located between the supporting member 121 and the bottom plate 101 and is supported by the first elastic members 206. The supporting plate 203 and the connecting part 204 respectively pass through the first through hole 117 and the second through hole 123 to expose out of the top plate 111. In this embodiment, the connecting part 204 is an electrical connector for electrically connecting with the electronic device 200.

A cylindrical guiding sleeve 202 is formed on each of two opposite ends of the main plate 201. The guiding sleeve 202 is configured to sleeve over the corresponding guiding pole 124 and moves back and forth along the guiding pole 124. The main plate 201 further includes two protruding poles 205 positioned between the two guiding sleeves 202. Each protruding pole 205 is adjacent to one of the two guiding sleeves 202. The two first elastic members 206 are mounted between the bottom plate 101 and the main plate 201 such that one end of each first elastic member 206 is sleeved on one of the protruding poles 205 and another end of each first elastic member 206 is received in one of the restricting members 103. The first elastic members 206 are arranged along an extending direction of the guiding poles 124.

The locking mechanism 30 includes a locking bracket 301, a restricting bracket 303 and a second elastic member 305. The restricting bracket 303 limits the locking bracket 301 to move along a deforming direction of the second elastic member 305. The locking bracket 301 is placed upon the restricting bracket 303 with the second elastic member 305 sandwiched therebetween. The locking bracket 301 includes two opposite locking arms 302, a first connecting arm 304 connected with the two locking arms 302, two opposite second connecting arms 306 and two opposite locking parts 307. The two locking arms 302 and the two locking parts 307 are parallel with each other and the two second connecting arms 306 are parallel with each other. Each second connecting arm 306 is connected between the locking part 307 and the first connecting arm 304. Each locking arm 302, the first connecting arm 304 and each second connecting arm 306 are perpendicular with each other.

Each of the second connecting arms 306 extends downwardly from a junction of the locking arm 302 and the first connecting arm 304. The locking part 307 extends perpendicularly from one end of each second connecting arm 306 away from the first connecting arm 304, along the direction of the locking arms 302.

An operating part 308 and a guiding part 310 protrude from the center of the first connecting arm 304. The operating part 308 and the guiding part 310 are perpendicular with each other. The operating part 308 is configured to be received in the locking hole 133 or passes through the locking hole 133 to expose out of the top plate 111. An extending direction of the guiding part 310 is opposite to that of the locking arms 302. A side of the guiding part 310 opposite to the operating part 308 defines a groove 312 to receive the second elastic member 305. One end of the second elastic member 305 resists against the first connecting arm 304, and the other end of the second elastic member 305 is received in the position member 131 and resists against the third sidewall 113.

The restricting bracket 303 includes a second connecting member 309, two opposite installing members 311, two locking members 316 respectively defined at ends of each installing member 311, and a supporting part 313 extending from the centre of the second connecting member 309. The installing members 311 perpendicularly extend from two opposite ends of the second connecting member 309, correspondingly. Each installing member 311 defines two screw holes 315 at two opposite ends. The locking members 316 are parallel with the second connecting member 309. The supporting part 313 and the installing members 311 extend from the second connecting member 309 along the same direction. In this embodiment, the supporting part 313 is parallel with the installing members 311. Each locking arm 302, each second connecting arm 306 and each locking part 307 are located in a space defined between each installing member 311 and the supporting part 313. Each locking arm 302 is located on a flat surface of the locking part 316. The guiding part 310 is arranged to overlap the supporting part 313 with the second elastic member 305 sandwiched therebetween. The second elastic member 305 is limited between the guiding part 310 and the supporting part 313.

The locking mechanism 30 further includes four bolts 314. The bolts 314 successively pass through the screw holes 315 of the restricting bracket 303 and the fixing holes 130 of the fixing bracket 126 to fix the restricting bracket 303 to the fixing bracket 126, thereby limiting the locking bracket 301 between the restricting bracket 303 and the fixing bracket 126.

Figure 5:
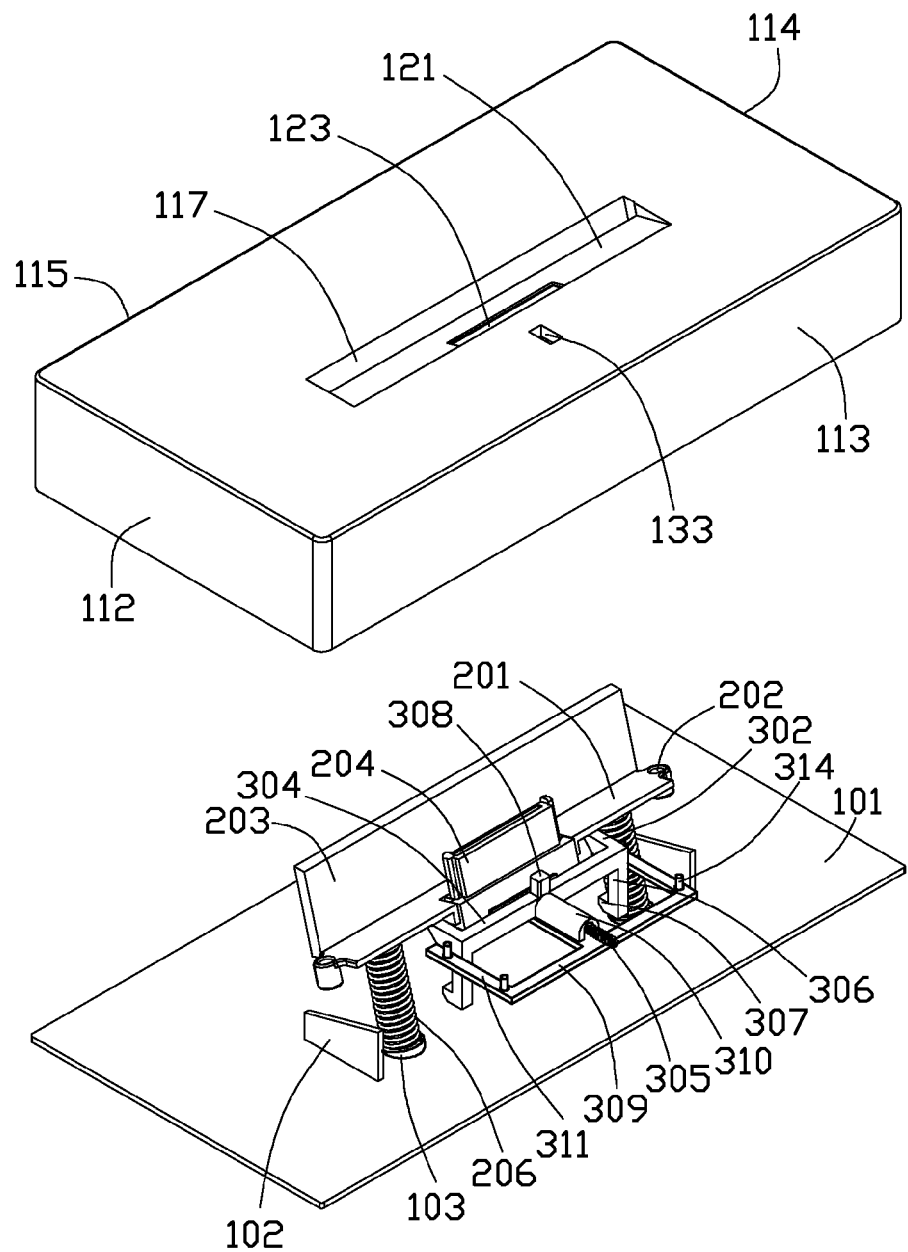
FIG. 5 is a partially assembling view of the docking station being in the first state.

Referring also to FIG. 5, in assembly, first, the two guiding sleeves 202 are respectively sleeved on the two guiding poles 124. One end of each first elastic member 206 is sleeved on the protruding pole 205, and another end of each first elastic member 206 is received in the restricting member 103. The first elastic member 206 is in an initial state. The two guiding poles 124 are respectively placed on one side of the baffles 102 away from the restricting member 103. Second, the locking bracket 301 is placed upon the restricting bracket 303 such that the locking arm 302 is located on the locking part 316. Thus, the locking arm 302 of the locking bracket 301 is locked to the main plate 201. The second elastic member 305 is received in the groove 312 with one end resisting against the first connecting arm 304 and the other end passing through the position member 131 to resist against the third sidewall 113. The second elastic member 305 is also in an initial state. Finally, the bolts 314 pass through the screw holes 315 and the fixing holes 130 to fix the restricting bracket 303 to the fixing bracket 126. After assembly, the docking station 100 is defined in a using state, and the extending mechanism 20 is located in the first position with the supporting plate 203, the connecting part 204 and the operating part 308 exposed out of the top plate 111 of the body 110. Referring to FIG. 6, the electronic device 200 is electrically connected to the connecting part 204 to fix to the docking station 100 in the using state.

Again referring to FIG. 1, in the using state, the extending mechanism 20 moves to the first position with the supporting plate 203 and the connecting part 204 exposed out of the docking station 100, and is positioned by the locking mechanism 30. Referring further to FIG. 5, in this state, the first elastic members 206 and the second elastic member 305 are in the initial state, the operating part 308 extends out of the locking hole 133, and the main plate 201 is supported by the locking arms 302 to stop the extending mechanism 20 moving downwardly. Referring also to FIG. 6, the electronic device 200 is electrically connected to the docking station 100 by being inserted into the connecting part 204, and is further supported by the supporting plate 203.

Figure 7:
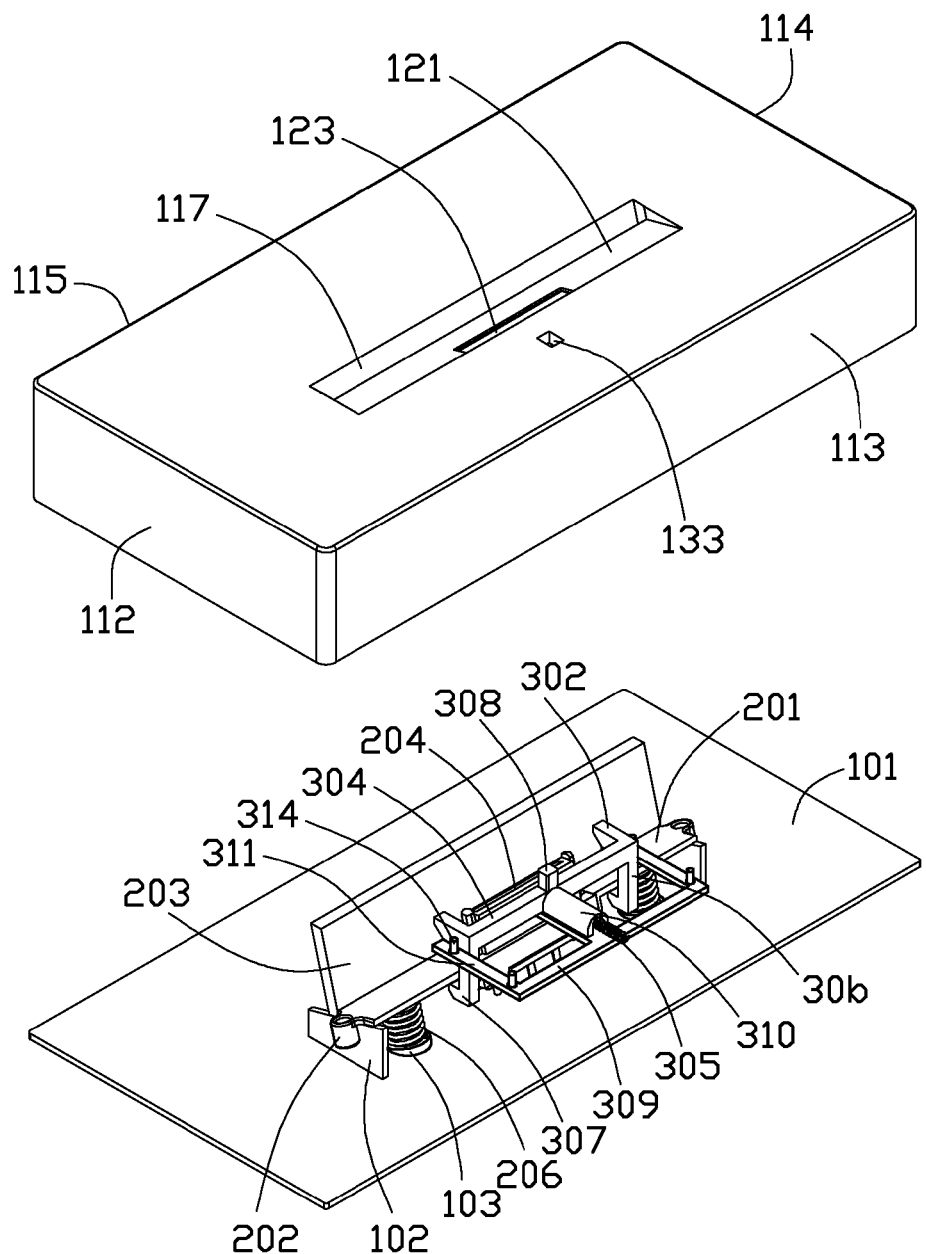
FIG. 7 is a partially assembling view of the docking station of FIG. 2 being in a second state.

Referring to FIG. 7, when the docking station 100 is unused, the extending mechanism 20 moves from the first position to the second position, the operating part 308 is moved along the locking hole 133 to make the second elastic member 305 be deformed and the locking arm 302 of the locking bracket 301 be detached from the main plate 201. At the same time, a force is applied on the supporting plate 203, the extending mechanism 20 compresses the first elastic members 206 and moves downwardly along the guiding poles 124 to be received in the body 110. Then the second elastic member 305 is released to drive the locking bracket 301 to move toward the extending mechanism 20 until the locking parts 307 of the locking bracket 301 lock to the main plate 201. The second elastic member 305 restores to the initial state and the first elastic members 206 are compressed. The main plate 201 is restricted between the assembling members 311 of the restricting bracket 303 and the locking parts 307 of the locking bracket 301 to stop the extending mechanism 20 moving downwardly. At this state, the supporting plate 203 and the connecting part 204 are wholly received in the body 110 and the operating part 308 is exposed out of the body 110 (see FIG. 8).

When the extending mechanism 20 moves from the first position to the second position, the extending mechanism 20 has not only a vertical displacement but also a horizontal displacement. The vertical displacement is the same as the deforming length of the first elastic members 206. The horizontal displacement of the extending mechanism 20 allows the locking part 307 to lock to the main plate 201.

When the docking station 100 moves from the second position to the first position. The operating part 308 is operated to make the second elastic member 305 be deformed and the locking parts 307 of the locking bracket 301 be detached from the main plate 201. The first elastic members 206 are released to make the extending mechanism 20 exposed out of the body 110. Then the second elastic member 305 is released to drive the locking bracket 301 to move toward the extending mechanism 20 until the locking arms 302 of the locking bracket 301 lock to the main plate 201 again. The first and second elastic members 206, 305 restore to the original state. The supporting plate 203, the connecting part 204 and the operating part 308 are exposed out of the top plate 111 and received in the housing 10.

With assistance of the docking station 100, the connecting part 204 is received in the docking station 100 to protect the connecting part 204 from contaminants.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A docking station for electrically connecting and supporting an electronic device comprising:
   a housing, and
   an extending mechanism slidably received in the housing, the extending mechanism capable of moving from a first position exposed out of the housing to a second position completely received in the housing,
   wherein the extending mechanism comprises a main plate, a supporting plate connected to the main plate and a connecting part for electrically connecting and supporting the electronic device, the connecting part is arranged at the main plate and is substantially parallel to the supporting plate, when the extending mechanism moves to the first position, the connecting part is exposed out of the housing, and when the extending mechanism moves to the second position, the connecting part is received in the housing.

2. The docking station of claim 1, wherein the main plate defines two guiding sleeves at opposite ends, the guiding sleeves extend along the direction away from the supporting plate, two guiding poles corresponding to the two guiding sleeves are defined in the housing, the two guiding sleeves are respectively sleeved on the two guiding poles to make the extending mechanism move from the first position to the second position.

3. The docking station of claim 2, further comprising at least one protruding pole projecting from the main plate, the at least one protruding pole extending in a direction same as the guiding poles.

4. The docking station of claim 3, wherein the extending mechanism further comprises at least one first elastic member, the at least one first elastic member sleeves on the at least one protruding pole for providing an elastic force to drive the extending mechanism from the second position to the first position, the at least one first elastic member is arranged along an extending direction of the guiding poles.

5. The docking station of claim 1, wherein the docking station further comprises a locking mechanism configured to lock the extending mechanism when the extending mechanism moves to the first position and the second position, correspondingly.

6. The docking station of claim 5, wherein the locking mechanism comprises a locking bracket, the locking bracket is received in the housing and configured to lock the extending mechanism in the first position and in the second position.

7. The docking station of claim 6, wherein the locking bracket comprises at least one locking arm, at least one locking part parallel with the at least one locking arm and a connecting arm connected between the at least one locking arm and the at least one locking part, the length of the at least one locking part is less than that of the at least one locking arm, when the at least one locking arm locks to the extending mechanism, the extending mechanism is in the first position; when the at least one locking part locks to the extending mechanism, the extending mechanism is in the second position.

8. The docking station of claim 7, wherein the locking mechanism further comprises a second elastic member, the second elastic member is secured to the locking bracket and is configured to provide an elastic force for driving the locking bracket to lock the extending mechanism in the first position and in the second position.

9. The docking station of claim 8, wherein the locking mechanism further comprises a restricting bracket, the restricting bracket is fixed to the housing, when the at least one locking arm locks to the extending mechanism, the restricting bracket supports the at least one locking arm to make the extending mechanism be positioned at the first position; when the at least one locking part locks to the extending mechanism, the restricting bracket resists against the extending mechanism, the extending mechanism is restricted between the at least one locking part and the restricting bracket to make the extending mechanism be positioned at the second position.

10. The docking station of claim 9, wherein the restricting bracket comprises a connecting member, at least one position member extending from one end of the connecting member, at least one locking member extending from one end of the at least one position member away from the connecting member and an installing member extending from the connecting member in a direction parallel with the at least one position member, the locking arm is positioned on the at least one locking member, the second elastic member is positioned on the installing member, the at least one locking arm, the connecting arm and the at least one locking part are positioned in a space defined between the at least one position member and the installing member, the restricting bracket restricts the locking bracket between the at least one locking member and the connecting member, wherein the extending mechanism locks with the at least one locking arm or the at least one locking part.

11. A docking station for electrically connecting an electronic device comprising:
a housing; and
a connecting part slidably coupled to the housing and for electrically connecting and supporting the electronic device, the connecting part capable of being moved from a first state being exposed out of the housing to a second state being hidden in the housing,
wherein the docking station comprises an extending mechanism, the extending mechanism comprises a main plate and a supporting plate connected to the main plate, the connecting part is attached at the main plate and is substantially parallel to the supporting plate, and the connecting part cooperates with the supporting plate to support the electronic device.

12. The docking station of claim 11, wherein two guiding sleeves are respectively defined at two ends of the main plate, the guiding sleeves extend along the direction away from the supporting plate, two guiding poles corresponding to the two guiding sleeves are defined in the housing, the two guiding sleeves are respectively sleeved on the two guiding poles to make the extending mechanism move from the first state to the second state.

13. The docking station of claim 12, further comprising at least one protruding pole projecting from the main plate, the at least one protruding pole extending in a direction same as the guiding poles.

14. The docking station of claim 13, wherein the extending mechanism further comprises at least one first elastic member, the at least one first elastic member sleeves on the at least one protruding pole for providing an elastic force to drive the extending mechanism from the second state to the first state, the at least one first elastic member is arranged along an extending direction of the guiding poles.

15. The docking station of claim 11, wherein the docking station further comprises a locking mechanism configured to lock the extending mechanism when the extending mechanism moves to the first state and the second state, correspondingly.

16. The docking station of claim 15, wherein the locking mechanism comprises a locking bracket, the locking bracket is received in the housing and configured to lock the extending mechanism in the first state and in the second state.

17. The docking station of claim 16, wherein the locking bracket comprises at least one locking arm, at least one locking part parallel with the at least one locking arm and a connecting arm connected between the at least one locking arm and the at least one locking part, the length of the at least one locking part is less than that of the at least one locking arm, when the at least one locking arm locks to the extending mechanism, the extending mechanism is in the first state; when the at least one locking part locks to the extending mechanism, the extending mechanism is in the second state.

18. The docking station of claim 17, wherein the locking mechanism further comprises a second elastic member, the second elastic member is secured to the locking bracket and is configured to provide an elastic force for driving the locking bracket to lock the extending mechanism in the first state and in the second state.

* * * * *